(12) United States Patent
Chen et al.

(10) Patent No.: US 7,102,381 B2
(45) Date of Patent: Sep. 5, 2006

(54) ADAPTIVE TERMINATION FOR OPTIMUM SIGNAL DETECTION

(75) Inventors: Feng Chen, Portland, OR (US); Qiang Zhang, Northborough, MA (US); Zuoguo Wu, Marlborough, MA (US)

(73) Assignee: Intel Corporation, Santa Clara, CA (US)

( * ) Notice: Subject to any disclaimer, the term of this patent is extended or adjusted under 35 U.S.C. 154(b) by 79 days.

(21) Appl. No.: 10/879,513

(22) Filed: Jun. 29, 2004

(65) Prior Publication Data

US 2005/0285621 A1    Dec. 29, 2005

(51) Int. Cl.
*H03K 17/16* (2006.01)
*H03K 19/003* (2006.01)
*H03H 9/00* (2006.01)
*H03B 11/00* (2006.01)

(52) U.S. Cl. .................... 326/30; 326/26; 326/27; 333/151

(58) Field of Classification Search .............. 326/30, 326/26–27; 333/151
See application file for complete search history.

(56) References Cited

U.S. PATENT DOCUMENTS

| 6,556,038 | B1 * | 4/2003 | Kim et al. | 326/30 |
| 6,812,735 | B1 * | 11/2004 | Pham | 326/30 |
| 6,836,143 | B1 * | 12/2004 | Song | 326/30 |
| 6,888,370 | B1 * | 5/2005 | Luo et al. | 326/30 |

* cited by examiner

*Primary Examiner*—Rexford Barnie
*Assistant Examiner*—Jason Crawford
(74) *Attorney, Agent, or Firm*—Schwegman, Lundberg, Woessner & Kluth, P.A.

(57) ABSTRACT

An integrated circuit includes a number of terminals to transfer signals. Each of the terminals has an adjustable termination impedance. The integrated circuit also includes a control circuit coupled to the terminals to adjust the value of the termination impedance of each of the terminals to improve signal detection at the terminals.

29 Claims, 5 Drawing Sheets

*FIG. 8* ent is kept at the chosen value when the environment factors changes.
ADAPTIVE TERMINATION FOR OPTIMUM SIGNAL DETECTION

FIELD

Embodiments of the present invention relate generally to integrated circuits, and more specifically, to integrated circuits having terminations.

BACKGROUND

A typical electrical device has terminals or pins. Cables or conducting traces on a circuit board are usually used as transmission lines connecting between the terminals of two or more devices to transfer signals between the devices.

To maintain the property of the signals during the transmission between the terminals and the transmission lines, each terminal of a typical electrical device usually has a termination resistor. The termination resistor often has a value chosen to match the resistance (impedance) value of the transmission line connected to the terminal to reduce signal reflection on the transmission line.

Changes in the environment factors such as manufacturing processes, voltage, and temperature may change the value of the termination resistor. Thus, various methods were developed to hold the value of the termination resistor at the chosen value when the environment factors changes.

In one known method, an external resistor is used as a reference to hold the termination resistor at the chosen value. However, the external resistor requires additional pins for the device. The additional pins waste available space and may increase the cost of the device. Further, even if the value of the termination resistor is kept at the chosen value using known methods, the resistance value of the transmission line may change due to changes in factors such as signal frequency and design topology of the transmission lines. Therefore, even if the value of the termination resistor remains at the chosen value, a mismatch may still exist between the value of the termination resistor and the resistance value of the transmission line.

The mismatch between the value of the termination resistor and the resistance value of the transmission line may cause degradation of the signal received at the terminal or may cause detection of the signal at the terminal more difficult or inaccurate.

DESCRIPTION OF EMBODIMENTS

The following description and the drawings illustrate specific embodiments of the invention sufficiently to enable those skilled in the art to practice the embodiments of the invention. Other embodiments may incorporate structural, logical, electrical, process, and other changes. In the drawings, like numerals describe substantially similar components throughout the several views. Examples merely typify possible variations. Portions and features of some embodiments may be included in or substituted for those of others. The scope of the invention encompasses the full ambit of the claims and all available equivalents.

Figure 1:
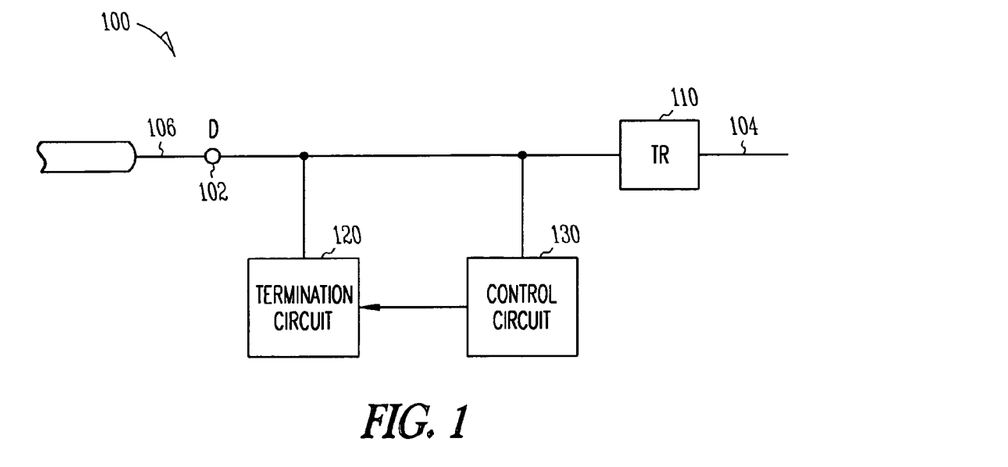
FIG. 1 shows an apparatus having a termination circuit and control circuit.

FIG. 1 shows an apparatus having a termination circuit and control circuit. Apparatus 100 may be included in a circuit, in an integrated circuit, or in an electrical device. Apparatus 100 includes a terminal 102 to transfer a signal D. The D signal may be an input signal received by apparatus 100 from a transmission line 106. The D signal may also be an output signal transmitted to transmission line 106 by apparatus 100. Apparatus 100 further includes a transfer circuit (TR) 110, a termination circuit 120, and a control circuit 130. Transfer circuit 110 transfers a signal between terminal 102 and an internal line 104. Transfer circuit 110 may include a transmitter, a receiver, or both.

Termination circuit 120 provides a termination impedance between terminal 102 and a supply node. The supply node may be either a supply voltage or ground. Termination circuit 120 includes a range of termination impedance values in which the impedance values include a range of termination resistance values. In termination circuit 120, the value of a termination resistance between terminal 102 and the supply node (e.g., ground) is selected from the range of resistance values of termination circuit 120. Thus, the value of the termination resistance between terminal 102 and the supply node is a variable termination resistance value.

In some embodiments, the value of the termination resistance at terminal 102 is initially set at an initial value equal to or approximately close to the resistance value of transmission line 106 for improved signal detection and signal accuracy at terminal 102. However, the impedance or resistance value of transmission line 106 may change due to changes in the environment factors. When the impedance or resistance value of transmission line 106 changes, a mismatch may exists between the initial value of the termination resistance at terminal 102 and the resistance value of transmission line 106.

The relationship between the value of the termination resistance at terminal 102 and the resistance value of transmission line 106 affects the detection of the D signal at terminal 102. The D signal may have different signal levels. The signal strength (energy) of the D signal within a time interval may be represented by a total value of the different signal levels of the D signal within the time interval. A mismatch between the value of the termination resistance at terminal 102 and the resistance value of transmission line 106 may reduce the signal strength of the D signal when the D signal arrives at terminal 102 from transmission line 106. Reducing in the signal strength may cause the detection of the D signal at terminal 102 more difficult and may lead to inaccurate signal.

Control circuit 130 controls the value of the impedance at terminal 102. In some embodiments, control circuit 130 controls value of the impedance at terminal 102 by controlling the value of the resistive component, or the reactive component, or both at terminal 102. In FIG. 1, control circuit 130 controls the value of the resistive component at terminal 102 by controlling the termination resistance at terminal 102 to allow optimum energy of the D signal to be preserved and received at terminal 102 to improve signal detection and signal accuracy at terminal 102. In some embodiments, the optimum energy of the D signal is the maximum available signal strength of the D signal. Control circuit 130 measures the signal strength of the D signal at terminal 102 to adjust the value of the termination resistance at terminal 102 to achieve the optimum signal energy.

In some embodiments, control circuit 130 measures the strength of the D signal by integrating the D signal in a number of integrations. Each of the integrations gives an integration result indicating the signal strength value of the D signal within an integration. Control circuit 130 compares the integration results of successive integrations. After each comparison, control circuit 130 may replace the value of the termination resistance at terminal 102 with a new value to reflect the comparison result. In some embodiments, the new value corresponds to the greater of the signal strength values from successive integrations.

Control circuit 130 acts as a feedback loop and constantly adjusts the value of the termination resistance at terminal 102 to reflect the signal strength values of the D signal between successive integrations. In some embodiments, control circuit 130 adjusts the value of the termination resistance at terminal 102 based on the greater signal strength value of the signal strength values of the D signal between successive integrations. Thus, control circuit 130 may set the termination resistance at different values during the adjustments. The different values may fluctuate within a range of values. After a number of integrations and comparisons by control circuit 130, range of values may become smaller or the different values may converge to a convergence value. As a result, improved or optimum signal detection at terminal 102 is achieved.

In some embodiments, a training sequence may be used to quickly obtain the converged value of the termination resistance. After the training sequence, control circuit 130 continues to adjust the value of the termination resistance to adapt to the termination resistance to changes in the resistance value of transmission line 106.

Figure 2:
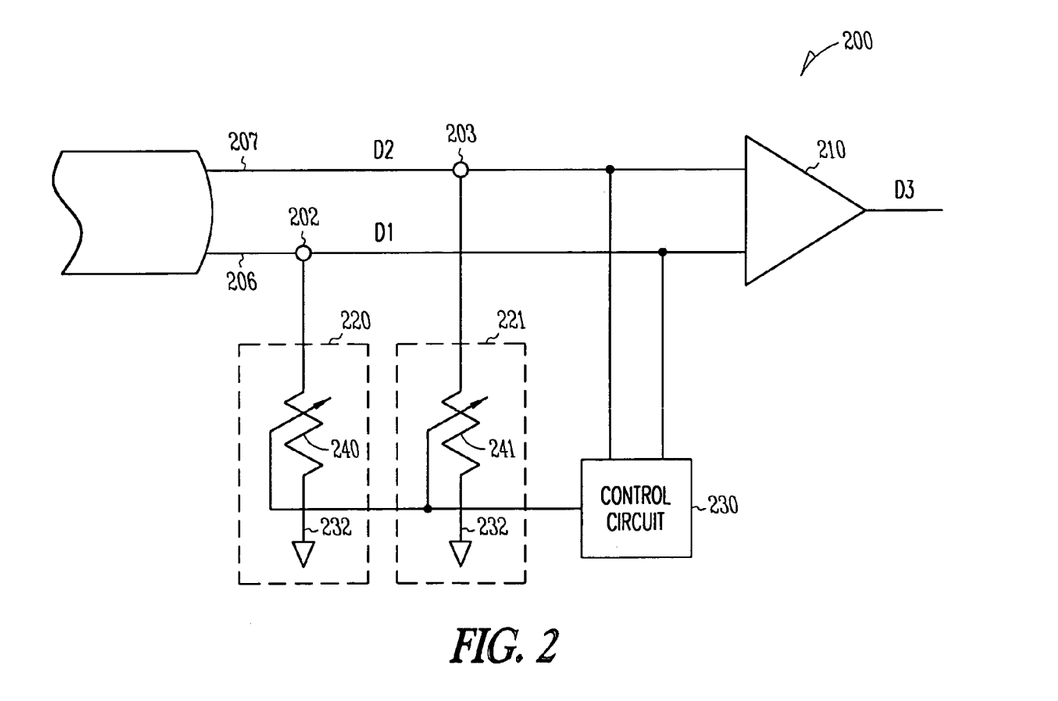
FIG. 2 shows an apparatus having a transfer circuit connected to multiple transmission lines.

FIG. 2 shows an apparatus having a receiver connected to multiple transmission lines. Apparatus 200 may be included in a circuit, in an integrated circuit, or in an electrical device. Apparatus 200 includes terminals 202 and 203. Terminal 202 receives a signal D1 from a transmission line 206. Terminal 203 receives a signal D2 from a transmission line 207. In some embodiments, D1 and D2 form a different signal pair. Apparatus 200 further includes a receiver 210, termination circuits 220 and 221, and a control circuit 230. Receiver 220 receives the D1 and D2 signals and generates an internal signal D3. The D3 signal may be a version of the D1 or D2 signal.

Termination circuit 220 includes a variable resistor 240 connected between terminal 202 and a supply node 232. Termination circuit 221 includes a variable resistor 241 connected between terminal 203 and supply node 232. In FIG. 2 supply node 232 connects to ground. In some embodiments, supply node 232 may connect to a supply voltage. Each of the variable resistors 240 and 241 has a range of resistance values.

Control circuit 230 controls the value of each of the variable resistors 240 and 241 to improve signal detection and signal accuracy at terminals 202 and 203. Control circuit 230 may include an embodiment of control circuit 130 of FIG. 1. Control circuit 230 of FIG. 2 controls the values of variable resistors 240 and 241 in a manner similar to the manner of control circuit 130 of FIG. 1.

Figure 3:
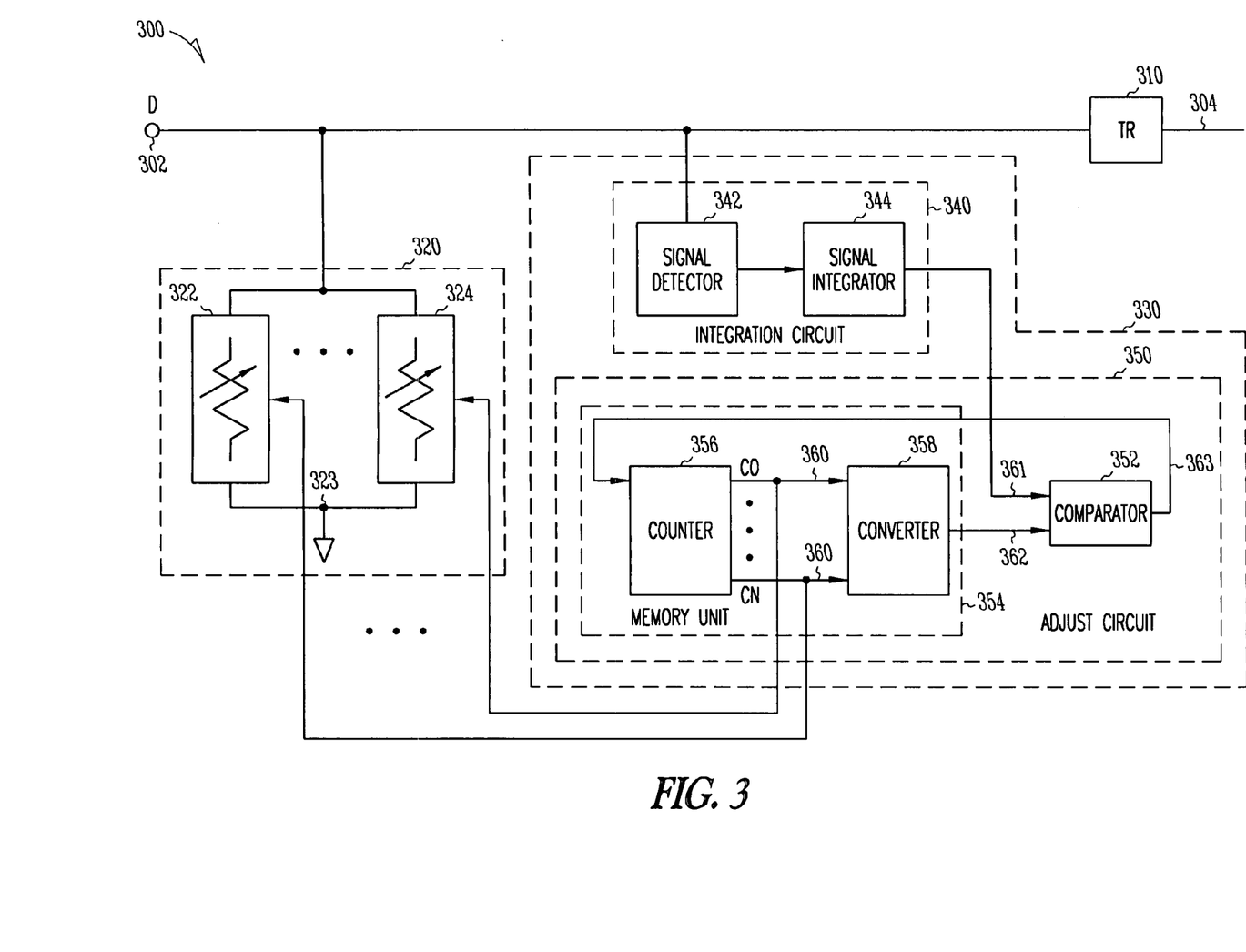
FIG. 3 shows an integrated circuit.

FIG. 3 shows an integrated circuit. Integrated circuit 300 includes a terminal 302 to transfer a signal D. Integrated circuit 300 also includes a transfer circuit (TR) 310, a termination circuit 320, and a control circuit 330. Transfer circuit 310 may include a transmitter, a receiver, or both to transfer a signal between terminal 302 and an internal line 304. A transmission line may be connected to terminal 302 and is omitted from FIG. 3 for simplicity. Termination circuit 320 may substitute termination circuit 120, 220, or 221 of FIG. 1 or FIG. 2. Control circuit 330 of FIG. 3 may substitute control circuit 130 or 230 of FIG. 1 or FIG. 2.

Termination circuit 320 provides a termination impedance between terminal 302 and a supply node 323. In FIG. 3 supply node 323 connects to ground. In some embodiments, supply node 323 may connect to a supply voltage. Termination circuit 320 includes a range of termination impedance values in which the impedance values include a range of termination resistance values. In termination circuit 320, the value of a termination resistance between terminal 302 and the supply node (e.g., ground) is selected from the range of resistance values of termination circuit 320. Thus, the value of the termination impedance or termination resistance between terminal 302 and supply node 323 is a variable value.

In this specification, a value of the termination impedance or a value of the termination resistance at a terminal refers to the value of the termination impedance between a terminal and a supply node such as a supply voltage or ground. Further, a value of the termination resistance or a value of the termination resistance at a terminal refers to the value of the termination resistance between a terminal and a supply node such as a supply voltage or ground. For example, in FIG. 3, the value of the termination resistance refers to the value of the termination resistance between terminal 302 and ground.

Termination circuit 320 includes number of resistive devices 322 and 324 connected in parallel between terminal 302 and ground. FIG. 3 shows two resistive devices for simplicity. The number of resistive devices of in FIG. 3 may be different from two. For example, the number of resistive devices may be one or eight or other numbers. The parallel combination of resistive devices 322 and 324 provides a termination resistance at terminal 302. Each of the resistive devices 322 and 324 includes an adjustable resistance. Different value of each of the resistive devices 322 and 324 produces a different value for the termination resistance. Thus, a range of values for the termination resistance exists. In some embodiments, the resolution of the value of the termination resistance at terminal 302 is defined by the number of the resistive devices such as resistive devices 322 and 324.

In some embodiments, resistive devices 322 and 324 are configured such that the value of the termination resistance at terminal 302 is set at an initial value. For example, the termination resistance at terminal 302 may be initially set at a value equal to the value of the resistance value of the transmission line connected to the terminal 302. The resistance value of the transmission line or the initial value of the termination resistance, or both may change due to variations in factors such as manufacturing process, operating voltage, and temperature.

As discussed above in FIG. 1, a mismatch between the value of the termination resistance at terminal 302 and the resistance value of the transmission line may reduce the signal strength of the D signal when the D signal arrives at terminal 302 from the transmission line. Reducing in the signal strength may cause the detection of the D signal at terminal 302 more difficult and may lead to inaccurate signal.

Control circuit 330 controls the value of the termination impedance at terminal 302 to improve signal detection and signal accuracy at terminal 302. In some embodiments, control circuit 330 controls value of the impedance at terminal 302 by controlling the value of the resistive component, or the reactive component, or both at terminal 302. In FIG. 3, control circuit 330 controls the value of the resistive component at terminal 302 by controlling the termination resistance at terminal 302.

Control circuit 330 includes an integration circuit 340 and an adjust circuit 350. Integration circuit 340 integrates the D signal to provide a number of integration results. Adjust circuit 350 compares the integration results to adjust the termination resistance.

Integration circuit 340 includes a signal detector 342 and a signal integrator 344. Signal detector 342 detects the D signal. Signal detector 342 may include a signal multiplier. In some embodiments, signal detector 342 samples the D signal at various sampled points during an integration time interval. The sampled points provide a number of sampled values. In some embodiments, signal detector 342 produces a number of absolute values based on the sampled values, each absolute value corresponds to one sampled value. Some embodiments exist in which signal detector 342 includes a subtract circuit to subtract a common mode voltage from a signal to obtain a subtracted signal, then signal detector 342 produces the absolute values of the signal based on the subtracted signal.

Signal integrator 344 integrates the D signal to produce an integration result. In some embodiments, signal integrator 344 integrates the absolute values to produce the integration result. Each integration result includes an integration value, which may correspond to the signal strength value of the D signal in an integration. Integration circuit 340 successively performs a number of integrations to obtain a number of integration results.

Adjust circuit 350 includes a comparator 352 and a memory unit 354. Comparator 352 compares successive integration results and provides a comparison result after each comparison. Memory unit 354 responds to the comparison result from comparator 352 to change the value of termination resistance. The successive integration results are provided to comparator 352 by lines 361 and 362. Line 361 carries the integration value of the current integration. Line 362 carries the integration value of the previous integration.

The values on lines 361 and 362 are analog values. In some embodiments, comparator 352 includes an analog circuit to compare the analog values on lines 361 and 362 to produce the comparison result. Line 363 carries the comparison result. In some embodiments, the signal on line 363 indicates a condition of the comparison result. For example, a low signal on line 363 may indicate a first condition of the comparison result in which the value one line 361 is less than the value on line 362. As another example, a high signal on line 363 may indicate a second condition of the comparison result in which the value one line 361 is greater than the value on line 362.

Memory unit 354 includes a counter 356 connected to comparator 352. Counter 356 includes a number of counter bit lines 360 to provide a number of counter bits C0 through CN. The combination of counter bits C0 through CN represents a count value. In some embodiments, counter 356 is an up-down counter. Counter 356 uses the count value to control the value of the termination resistance. Each count value corresponds to a value of the termination resistance. Thus, when counter 356 changes the count value, the value of the termination resistance also changes.

Counter 356 changes the count value based on different conditions of the comparison result. As described above, the signal on line 363 indicates the conditions of the comparison result in which the integration value of the current integration may be less than or greater than the integration value of the previous integration. In some embodiments, counter 356 increases the value of the termination resistance when the integration value of the current integration is greater than the integration value of the previous integration. In other embodiments, counter decreases the count value to decrease the value of the termination resistance when the integration value of the current integration is less than the integration value of the previous integration.

Memory unit 356 further includes a converter 358. In some embodiments, converter 358 includes a digital to analog converter. Converter 358 converts the count value represented by counter bits C0 through CN into a converted value. Each counter value corresponds to a converted value. Since each count value corresponds to an integration value from a previous integration, each converted value also corresponds to an integration value from the previous integration. Converter 358 provides the converted value (previous integration value) to line 362 for use in the comparison by comparator 352.

Control circuit 330 acts as a feedback loop and constantly adjusts the value of the termination resistance at terminal 302 to reflect the signal strength values of the D signal between successive integrations. Thus, control circuit 330 may set the termination resistance at different values during the adjustments. The different values may fluctuate within a range of values. After a number of integrations and comparisons by control circuit 330, range of values may become smaller or the different values may converge to a convergence value. As a result, improved or optimum signal detection at terminal 302 is achieved.

In some embodiments, the integration time interval in integrated circuit 300 is chosen at an appropriate value such that control circuit 330 may quickly adapt to the changes in the impedance value of the transmission line due to changes environment factor. Further, the integration time interval in integrated circuit 300 is also chosen at an appropriate value such that comparator 352 may quickly compare the integration values to achieve the convergence value for the termination resistance.

In some embodiments, a training sequence may be used to quickly obtain the converged value of the termination resistance. After the training sequence, for example during the normal operation of integrated circuit 300, control circuit 330 continues to adjust the value of the termination resistance to adapt to the termination resistance to changes in the resistance value of the transmission line. In some embodiments, the value of integration time interval during the training sequence is unequal to the value of the integration time interval after the training sequence. For example, the value of the integration time interval during the training sequence may be smaller than the value of the integration time interval after the training sequence so that the converged value of the termination resistance may be quickly obtained.

FIG. 3 shows a single terminal 302 connected to transfer circuit 310. However, multiple terminals with multiple variable termination resistances may be connected to transfer circuit 310 to provide differential signal. For example, embodiment of apparatus 200 of FIG. 2 may be included in integrated circuit 300 of FIG. 3 to provide differential signal to transfer circuit 310.

Figure 4:
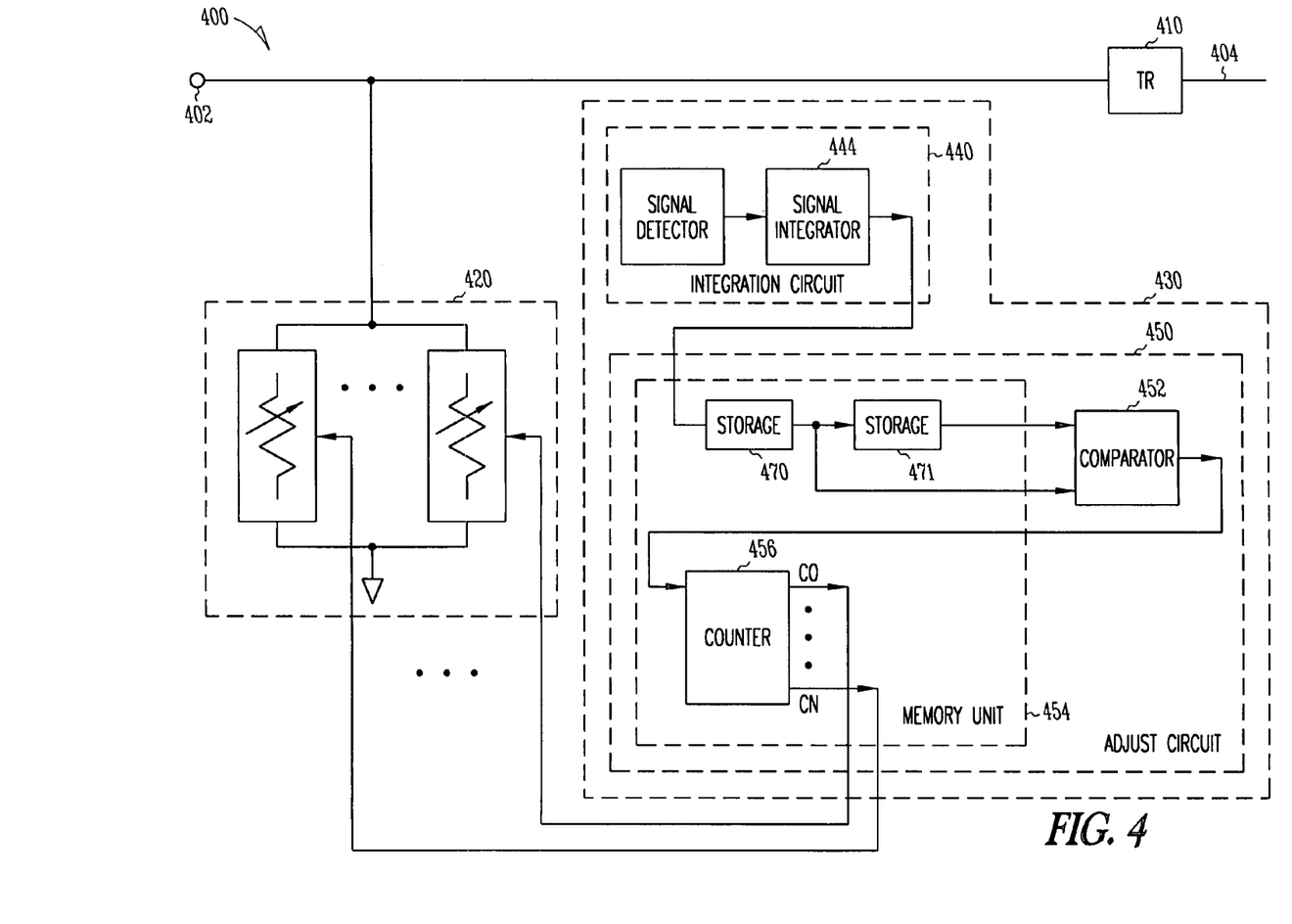
FIG. 4 shows an integrated circuit having a digital adjust circuit.

FIG. 4 shows an integrated circuit having a digital adjust circuit. Integrated circuit 400 includes a terminal 402, a transfer circuit 410, a termination circuit 420, and a control circuit 430. The elements of integrated circuit 400 serve the functions similar to that of the elements of integrated circuit 300 of FIG. 3. Transfer circuit 410 transfers a signal between terminal 402 and internal line 404. Termination circuit 420 provides a termination resistance between terminal 402 and ground. Control circuit 430 adjusts the value of the termination resistance based on the integration result of integration of the signal at terminal 402 to improve signal detection at terminal 402.

In FIG. 4, however, signal integrator 444 may include a digitizer or an analog to digital converter to convert an integration result into a digital value. The digital value may include multiple binary bits. Further, in FIG. 4, memory unit 454 includes storage 470 and storage 471 to store the digital value of the integration result. Each of the storage 470 and storage 471 may include multiple cells to store the multiple bits of the digital value of the integration result. Storage 470 stores a digital value the integration result of the current integration. Storage 471 stores a digital value of the integration result of the previous integration.

Comparator 452 compares the digital values in storage 470 and 471 and provides the comparison result to counter 456. Comparator 452 may include a digital circuit to compare the digital values in storage 470 and storage 471. In some embodiments, comparator 452 performs a math operation such as addition or subtraction on the digital values in storage 470 and 471. The result of the math operation indicates the condition of the comparison result. For example, comparator 452 may produce one or more carry bits from the result of the addition or subtraction. The values of the carry bits may be used to indicate the condition of the comparison result.

Counter 456 changes the count value based on the conditions of the comparison result. For example, counter 456 may increase or decrease the count value based on the value of the carry bits from the comparator 452. In response to the change in the count value, the value of the termination resistance may increase or decrease. Similarly to the function of control circuit 330 of FIG. 3, control circuit 430 of FIG. 4 constantly adjusts the value of the termination resistance at terminal 402 to improve the signal detection at terminal 402.

FIG. 4 shows a single terminal 402 connected to transfer circuit 410. However, multiple terminals with multiple variable termination resistances may be connected to transfer circuit 410 to provide differential signal. For example, embodiment of apparatus 200 of FIG. 2 may be included in integrated circuit 400 of FIG. 4 to provide differential signal to transfer circuit 410.

Figure 5:
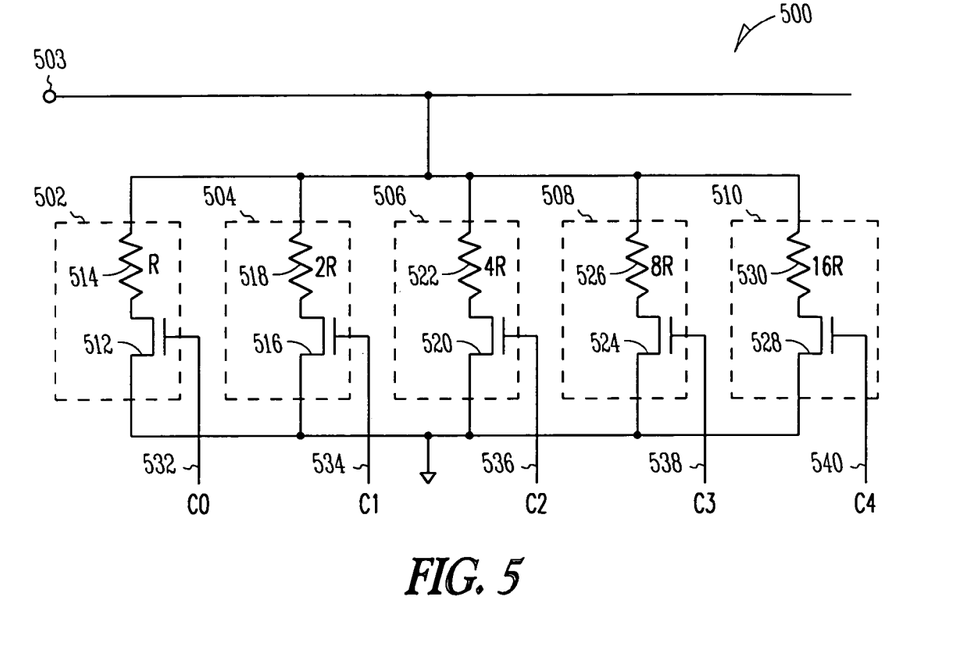
FIG. 5 shows a termination circuit with parallel switches.

FIG. 5 shows a termination circuit with adjustable resistance network. Termination circuit 500 may substitute termination circuit 120, 220, 221, 320, or 430 of FIG. 1 through FIG. 4. In FIG. 5, termination circuit 500 includes an adjustable resistance network formed by multiple resistive devices, each having a control input node. For example, termination circuit 500 includes resistive devices 502, 504, 506, 508, and 510. Each of the resistive devices includes a transistor and a fixed value resistor. For example, resistive device 502 includes transistor 512 and resistor 514. Likewise, resistive devices 504, 506, 508, and 510 include transistors 516, 520, 524, and 528 and resistors 518, 522, 526, and 530, respectively.

Each resistive device is coupled in parallel between terminal 503 and ground. Each resistive device includes a control input node having a signal that either turns on or turns off the transistor. For example, transistor 512 within resistive device 502 has a gate driven with the signal on control node 532. Likewise, control nodes 534, 536, 538, and 540 provide control signals to transistors 516, 520, 524, and 528, respectively.

The resistors within the resistive devices can be any type of resistor fabricated on an integrated circuit. In some embodiments, resistors are fabricated as n-well resistors, as is known in the art. In FIG. 5, the resistive devices have binary weighted resistance values. For example, resistor 514 has a resistance value of "R", and resistor 514 has a resistance value of "2R". The resistance values double for each resistive device, and the largest resistance value of "16R" exists in resistance element 510.

In some embodiments, the resistance values of the resistors can vary over process. For example, when resistors 514, 518, 522, 526, and 530 are fabricated as n-well resistors, the resistance values are variable to the extent that the process varies. For any given device, however, the relative resistance values of resistors 514, 518, 522, 526, and 530 are substantially constant, thereby allowing a desired resistance value to be obtained by controlling transistors 512, 516, 520, 524, and 528.

Control input nodes 532, 534, 536, 538, and 540, taken together, form a control bus. In FIG. 5, this control bus is driven by a five bit wide signal (five bits) labeled C0 through C4. In some embodiments, the values of bits C0 through C4 are provided by a counter such as counter 356 of FIG. 3 or counter 456 of FIG. 4. By varying which control signals (bits) are asserted, 31 different resistance values can be obtained between terminal 503 and ground.

Termination circuit 500 uses n-channel transistors, and is useful to implement resistors with voltages closer to a negative voltage reference than to a positive voltage reference. In some embodiments, termination circuit 500 uses p-channel transistors, and is useful to implement resistors with voltages closer to a positive voltage reference than to a positive voltage reference Termination circuit 500 has been described with resistive devices, each including a resistor with a binary weighting relative to the other resistors. Any number of resistive devices can be included without departing from the scope of the present invention. Binary weighting can be maintained with a large number of resistive devices, or a linear weighting can be employed. For example, termination circuit 500 can be implemented with each resistive device including a resistor of equal value. This reduces the number of possible resistance values available, but also reduces the possibility of a transient resistance value appearing when signal values on the input bus change.

Figure 6:
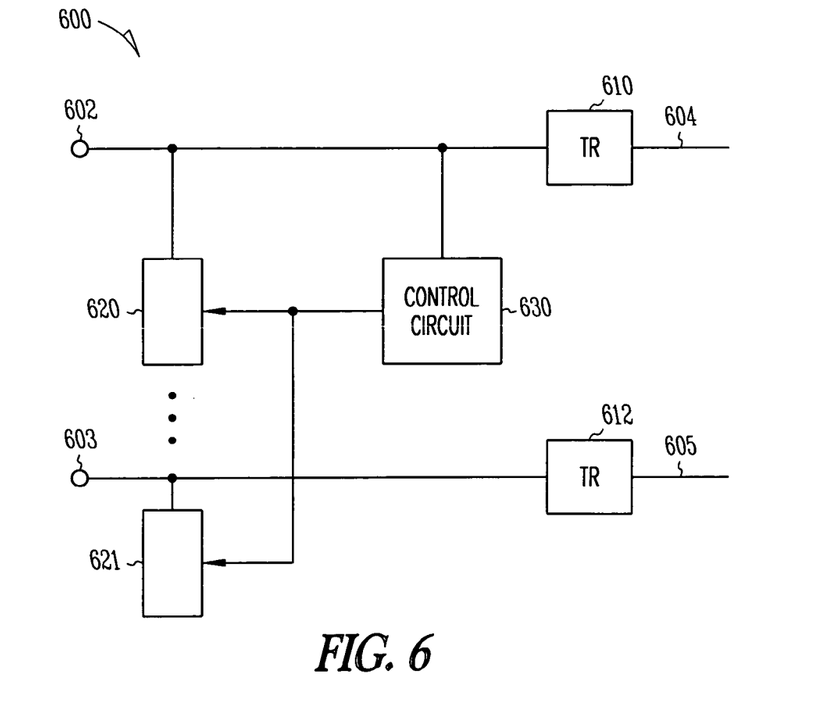
FIG. 6 shows an integrated circuit with multiple termination circuits and a control circuit.

FIG. 6 shows an integrated circuit with multiple termination circuits and a control circuit. Integrated circuit 600 includes a number of terminals 602 and 603. FIG. 6 shows two terminals with two corresponding termination circuits for simplicity. The number of terminals and the number of the corresponding termination circuits of FIG. 6 may be different from two. In some embodiments, a combination of two terminals of integrated circuit 600 forms a differential pair to provide differential signals. For example, the combination terminals 602 and 603 may form a differential pair.

Integrated circuit 600 includes termination circuits 620 and 621, transfer circuits 610 and 612, and a control circuit 630. Transfer circuits 610 and 612 transfer signals between the terminals (602 and 603) and the internal lines (604 and 605). Termination circuit 620 connects between terminal 602 and ground to provide a termination resistance at terminal 602. Termination circuit 621 connects between terminal 603 and ground to provide a termination resistance at terminal 603.

Integrated circuit 600 may include embodiments of FIG. 1 through FIG. 5. For example, each of the termination circuits 620 and 621 may include embodiment of termination circuit 120, 220, 221, 320, 420, or 500 of FIG. 1 through FIG. 5. Control circuit 630 of FIG. 6 may include embodiment of control circuit 130, 230, 330, or 430 of FIG. 1 through FIG. 4. In FIG. 6, control circuit 600 adjusts the termination resistance of each of the termination circuits 620 and 621 in manner similar to the manner of control circuit 130, 230, 330, or 430 of FIG. 1 through FIG. 4.

Figure 7:
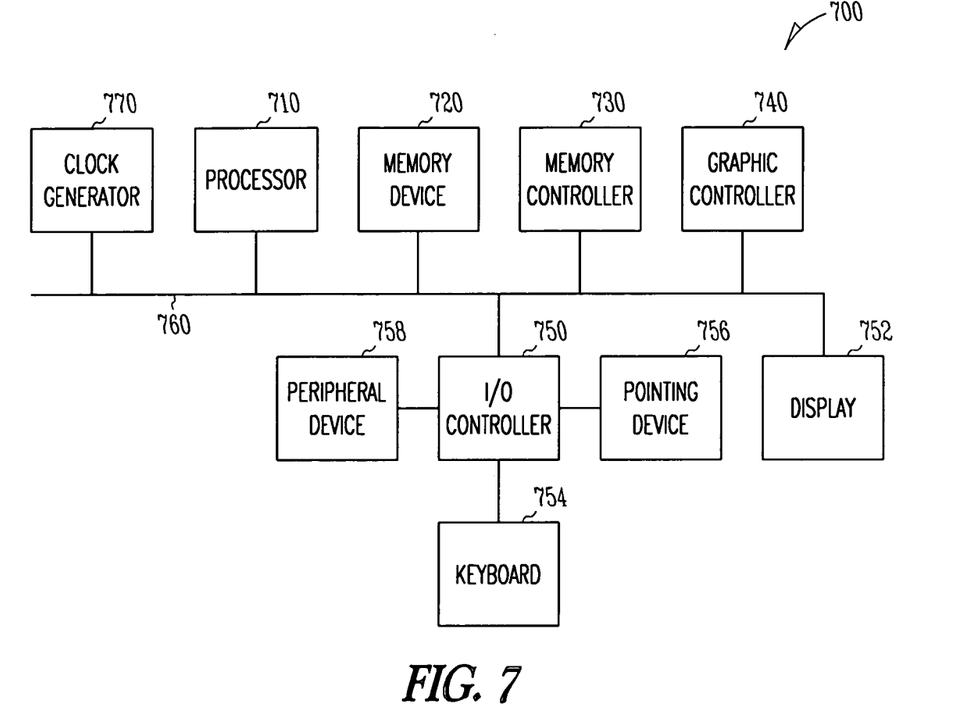
FIG. 7 shows a system.

FIG. 7 shows a system. System 700 includes a processor 710, a memory device 720, a memory controller 730, a graphic controller 740, an input and output (I/O) controller 750, a display 752, a keyboard 754, a pointing device 756, and a peripheral device 758. A bus 760 connects all of these devices together. A clock generator 770 provides an external clock signal to at least one of the devices of system 700. Example of clock generator 770 includes an oscillator in a circuit board such as a motherboard. Two or more devices shown in system 700 may be formed in a single chip.

At least one of the devices shown in system 700 includes an embodiment of integrated circuit 600 of FIG. 6 in which integrated circuit 600 may include embodiments of FIG. 1 through FIG. 5.

Bus 760 may be interconnect traces on a circuit board or may be one or more cables. Bus 760 may also connects the devices of system 700 by wireless means such as electromagnetic radiation (e.g., radio waves). Peripheral device 758 may be a printer, an optical device (e.g., a CD-ROM device or a DVD device), a magnetic device (e.g., floppy disk driver), or an audio device (e.g., a microphone).

Memory device 720 may be a dynamic random access memory (DRAM) device. Examples of DRAM devices include synchronous DRAM commonly referred to as SDRAM, SDRAM II, SGRAM (Synchronous Graphics Random Access Memory), DDR (Double Data Rate) SDRAM, GDDR (Graphic Double Data Rate) SDRAM. Memory device 720 may also be a static random access memory (SRAM) device, or may be a flash memory device.

In some embodiments, system 700 may omit some of the elements shown in FIG. 7.

System 700 of FIG. 7 includes computers (e.g., desktops, laptops, hand-helds, servers, Web appliances, routers, etc.), wireless communication devices (e.g., cellular phones, cordless phones, pagers, personal digital assistants, etc.), computer-related peripherals (e.g., printers, scanners, monitors, etc.), entertainment devices (e.g., televisions, radios, stereos, tape and compact disc players, video cassette recorders, camcorders, digital cameras, MP3 (Motion Picture Experts Group, Audio Layer 4) players, video games, watches, etc.), and the like.

Figure 8:
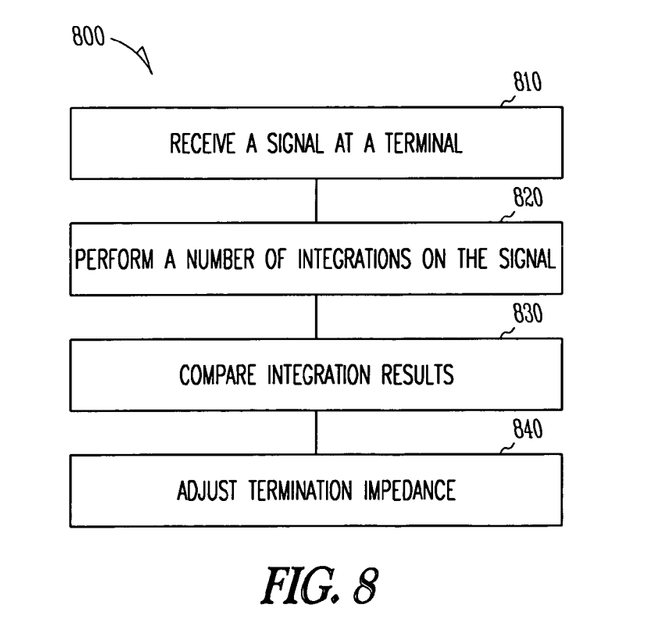
FIG. 8 shows a flowchart.

FIG. 8 shows a flowchart of a method. Method 800 adjusts a termination impedance between a terminal and a supply node. Method 800 may be used to adjust the termination impedance of the termination circuit of FIG. 1 through FIG. 7. Method 800 may also be used to adjust a termination impedance of a device in a system such as system 700 of FIG. 7.

Box 810 receives a signal at a terminal of a device. The signal may be an input signal received by the device. The signal may also be an output signal outputted by the device. In some embodiments, the signal is one signal of a different signal pair. The device in box 810 may include one or more of the embodiments of FIG. 1 through FIG. 7.

Box 820 performs a number of integrations on the signal. Each of the integrations is performed in an equal integration time interval. Each of the integrations produces an integration result with an integration value. The integrations in box 820 may be performed by integration circuit such as integration circuit 340 of FIG. 3 or integration circuit 440 of FIG. 4.

Box 830 compares successive integration values performed by box 820. In some embodiments, box 830 compares the integration value a current integration with the integration value a current integration with the integration value of a previous integration. The comparison in box 830 produces a comparison result. The comparison may be performed by a compare circuit such as compare circuit 352 of FIG. 3 or compare circuit 452 of FIG. 4.

Box 840 adjusts a value of a termination impedance between the terminal and a supply node based on the comparison result. In some embodiments, box 840 adjusts the value of the termination impedance by adjusting a value of a termination resistance at the terminal. The termination resistance may be provided by a termination circuit such as termination circuits shown in FIG. 1 through FIG. 7. Box 840 may use an adjust circuit such as adjust circuit 350 of FIG. 3 or adjust circuit 450 of FIG. 4.

Method 800 adjusts the value of the termination impedance at the terminal to improve the detection of the signal at the terminal.

What is claimed is:

1. An apparatus comprising:
a terminal to receive a signal;
a termination circuit coupled to the terminal to provide a termination impedance between the terminal and a supply node; and
a control circuit coupled to the terminal and the termination circuit, the control circuit including a first circuit to adjust a value of the termination impedance based on successive integrations of the signal received at the terminal by a second circuit of the control circuit.

2. The apparatus of claim 1, wherein the termination circuit includes a plurality of resistive devices in parallel, each of the resistive devices having a control input node to enable the resistive device.

3. The apparatus of claim 2, wherein each of the resistive devices includes a transistor coupled between the terminal and the supply node.

4. The apparatus of claim 3, wherein each of the resistive devices includes a resistor coupled in series with the transistor.

5. An apparatus comprising:
a terminal to receive a signal;
a termination circuit coupled to the terminal to provide a termination impedance between the terminal and a supply node; and
a control circuit responsive to the signal at the terminal to adjust a value of the termination impedance, wherein the control circuit includes:
an integration circuit to integrate the signal for an integration time interval to produce an integration result; and
an adjust circuit to adjust the value of the termination impedance based on the integration result.

6. The apparatus of claim 5, wherein the adjust circuit includes:
a comparator to compare the integration result of a current integration with the integration result of a previous integration; and
a memory unit including a counter coupled to the comparator, the counter including a number of counter bit lines responsive to a compare result from the comparator to provide a count value corresponding to the value of the termination impedance.

7. The apparatus of claim 5, wherein the integration circuit includes:
a signal detector to generate a number of absolute values based on a number of sampled values sampled from the signal during the integration time interval; and
an signal integrator to integrate the absolute values to produce the integration result.

8. An integrated circuit comprising:
a plurality of terminals to receive a plurality of signals;
a plurality of adjustable resistance networks, each of the adjustable resistance networks coupled to one of the terminals; and
a control circuit coupled to the adjustable resistance networks and the terminals, the control circuit including a first circuit to adjust a resistance value of each of the adjustable resistance networks based on successive integrations of at least on of the signals received at the terminals by a second circuit of the control circuit.

9. An integrated circuit comprising:
a plurality of terminals to receive a plurality of signals;
a plurality of adjustable resistance networks, each of the adjustable resistance networks coupled to one of the terminals; and
a control circuit coupled to the adjustable resistance networks to adjust a resistance value of each of the adjustable resistance networks, wherein the control circuit includes an integration circuit to integrate a selected signal among the signals to produce an integration result, and an adjust circuit to adjust the resistance value based on the integration result.

10. The integrated circuit of claim 9, wherein the adjust circuit includes:
a comparator to compare the integration result of a current integration with the integration result of a previous integration; and
a memory unit including a counter coupled to the comparator, the counter including a number of counter bit lines to provide a number of bit values based on a compare result from the comparator.

11. The integrated circuit of claim 10, wherein each of the adjustable resistance networks includes a number of switches coupled in parallel between each of the terminals and a supply node, and wherein each of the switches including a control node coupled to one of the counter bit lines.

12. The integrated circuit of claim 11, wherein memory unit further include a converter to convert a digital value represented by the counter bit lines to an analog value representing the integration result of a previous integration.

13. The integrated circuit of claim 10, wherein the memory unit further includes:
a first storage to store a digital value of the integration result of the current integration; and
an second storage to store a digital value of the integration result of the previous integration.

14. The integrated circuit of claim 9, wherein the integration circuit includes:
a signal detector to generate a number of absolute values of the selected signal based on a number of sampled values sampled from the selected signal within a time interval; and
an integrator to integrate the absolute values generated during the time interval to produce the integration result.

15. The integrated circuit of claim 14, wherein each of the adjustable resistance networks includes a number of resistive devices coupled in parallel between the terminal and a supply node.

16. The integrated circuit of claim 15, wherein each of the resistive devices includes a resistor and a transistor coupled in series with the resistor.

17. A system comprising:
a processor; and
a number of transmission lines coupled to the processor; and
a random access memory device coupled to the transmission lines, at least one of the processor and the random access memory device including:
a plurality of terminals coupled to the transmission lines;
a plurality of adjustable resistance networks, each of the adjustable resistance networks coupled to one of the terminals; and
a control circuit coupled to the adjustable resistance networks and the terminals, the control circuit including a first circuit to adjust a resistance value of each of the adjustable resistance networks based on successive integrations of at least one of the signals received at the terminals by a second circuit of the control circuit.

18. A system comprising:
a processor; and
a number of transmission lines coupled to the processor; and
a random access memory device coupled to the transmission lines, at least one of the processor and the random access memory device including:
a plurality of terminals coupled to the transmission lines;
a plurality of adjustable resistance networks, each of the adjustable resistance networks coupled to one of the terminals; and
a control circuit coupled to the adjustable resistance networks to adjust a resistance value of each of the adjustable resistance networks, wherein the control circuit includes an integration circuit to integrate a selected signal among the signals to produce an integration result, and an adjust circuit to adjust the resistance value of each of the adjustable resistance networks based on the integration result.

19. The system of claim 18, wherein the integration circuit includes:
a signal detector to generate the absolute values based on a number of sampled values sampled from the selected signal; and
an integrator to integrate the absolute values to produce the integration result.

20. The system of claim 19, wherein the adjust circuit includes:
a comparator to compare the integration result of a current integration with the integration result of a previous integration; and
a memory unit including a counter coupled to the comparator, the counter including a number of counter bit lines to provide a number of bit values based on a compare result from the comparator.

21. The system of claim 20, wherein each of the adjustable resistance networks includes a number of resistive devices in parallel, each of the resistive devices having a control input node coupled to one of the counter bit lines.

22. The system of claim 21, wherein each of the resistive devices includes a resistor, and a transistor coupled in series with the resistor.

23. A method comprising:

receiving a signal at a terminal;

performing an integration on the signal received at the terminal during an integration time interval to produce an integration result;

comparing the integration result of a current integration with the integration result of a previous integration to produce a comparison result; and adjusting a value of a termination impedance of the terminal based on the comparison result.

24. The method of claim 23, wherein performing the integration includes integrating a number of sampled values of the signal taken during the integration time interval.

25. The method of claim 23, wherein adjusting the value of the termination impedance includes adjusting a value of a variable termination resistance.

26. The method of claim 23, wherein adjusting the value of the termination impedance includes increasing a value of a termination resistance based on a first condition of the comparison result.

27. The method of claim 26, wherein adjusting the value of the termination impedance includes decreasing the value of the termination resistance based on a second condition of the comparison result.

28. The method of claim 24, wherein comparing includes comparing digital value of the integration result of the current integration with digital value of the integration result of the previous integration.

29. The method of claim 24, wherein comparing includes comparing analog value of the integration result of the current integration with analog value of the integration result of the previous integration.

* * * * *

UNITED STATES PATENT AND TRADEMARK OFFICE
CERTIFICATE OF CORRECTION

| | | |
|---|---|---|
| PATENT NO. | : 7,102,381 B2 | |
| APPLICATION NO. | : 10/879513 | |
| DATED | : September 5, 2006 | |
| INVENTOR(S) | : Chen et al. | |

It is certified that error appears in the above-identified patent and that said Letters Patent is hereby corrected as shown below:

On the Title page, in field (56), under "U.S. Patent Documents", in column 2, line 1, above "6,556,038 B1 * 4/2003 Kim et al. 326/30" insert -- 6,026,456 * 2/2000 Ilkbahar 710/100 --.

In column 11, line 8, in Claim 7, delete "an" before "signal" and insert -- a --, therefor.

In column 11, line 19, in Claim 8, after "least" delete "on" and insert -- one --, therefor.

In column 11, line 57, in Claim 13, delete "an" before "second" and insert -- a --, therefor.

In column 12, line 22, in Claim 17, delete "the" before "adjustable".

Signed and Sealed this

First Day of July, 2008

JON W. DUDAS
*Director of the United States Patent and Trademark Office*